Patented May 4, 1954

2,677,235

UNITED STATES PATENT OFFICE 2,677,235

GAS TURBINE POWER PLANT FOR UTILIZING SOLID WATER-BEARING FUEL

Campbell H. Secord, London, England, assignor to Power Jets (Research and Development) Limited, London, England, a British company Application July 11, 1949, Serial No. 103,993

Claims priority, application Great Britain July 21, 1948

7 Claims. (Cl. 60—39.05)

This invention relates to improvements in internal combustion gas turbines and has, as one of its objects, to provide a gas turbine engine which is of smaller dimensions for a given output, or which has a greater output for given dimensions than has hitherto been possible, thereby reducing the specific cost and weight of the prime mover accordingly.

Another object of the invention is to enable use to be made of a fuel which is wet in the sense that it contains or is otherwise combined with at least its own weight of water, but which may contain in the raw state or after preliminary treatment as much as ten or even more times its own weight, the maximum ratio depending upon the calorific value of the fuel and the extent to which preliminary dewatering can be readily achieved. Such a fuel may for example be bagasse, sewage sludge, coal slurry, sulphite pulp-mill waste or town refuse. Another such wet fuel is peat, which is available in abundance and excellent quality, but which has a very high water content largely of a virtually colloidal character, making existing methods of drying very costly. The invention has particular reference to the use of peat.

The quantity of air used in a gas turbine is normally greatly in excess of the quantity required for complete combustion of the fuel since it is necessary to dilute the hot combustion gases so that a designed maximum temperature at the turbine inlet is maintained. By introducing water in the working fluid system and passing it through the turbine, the amount of excess air can be considerably reduced and the size of the plant correspondingly decreased, or alternatively the output increased without a corresponding increase in size of the plant.

Since the recondensation of exhaust steam which is mixed with the products of combustion would generally be prohibitively troublesome, the introduction of water into the working fluid system will entail the supply of very large quantities of water, i. e. of the order of that consumed by steam turbine station cooling towers. While enough water will usually be available for peakload and auxiliary applications, large scale baseload operation will in some localities only be possible if the fuel used itself supplies the water required. Accordingly, the invention provides a gas turbine plant wherein a wet fuel is consumed, part or all the water content thereof being introduced into the gas turbine cycle.

By way of example two forms of the invention are illustrated diagrammatically in the accompanying drawings.

Figure 1:
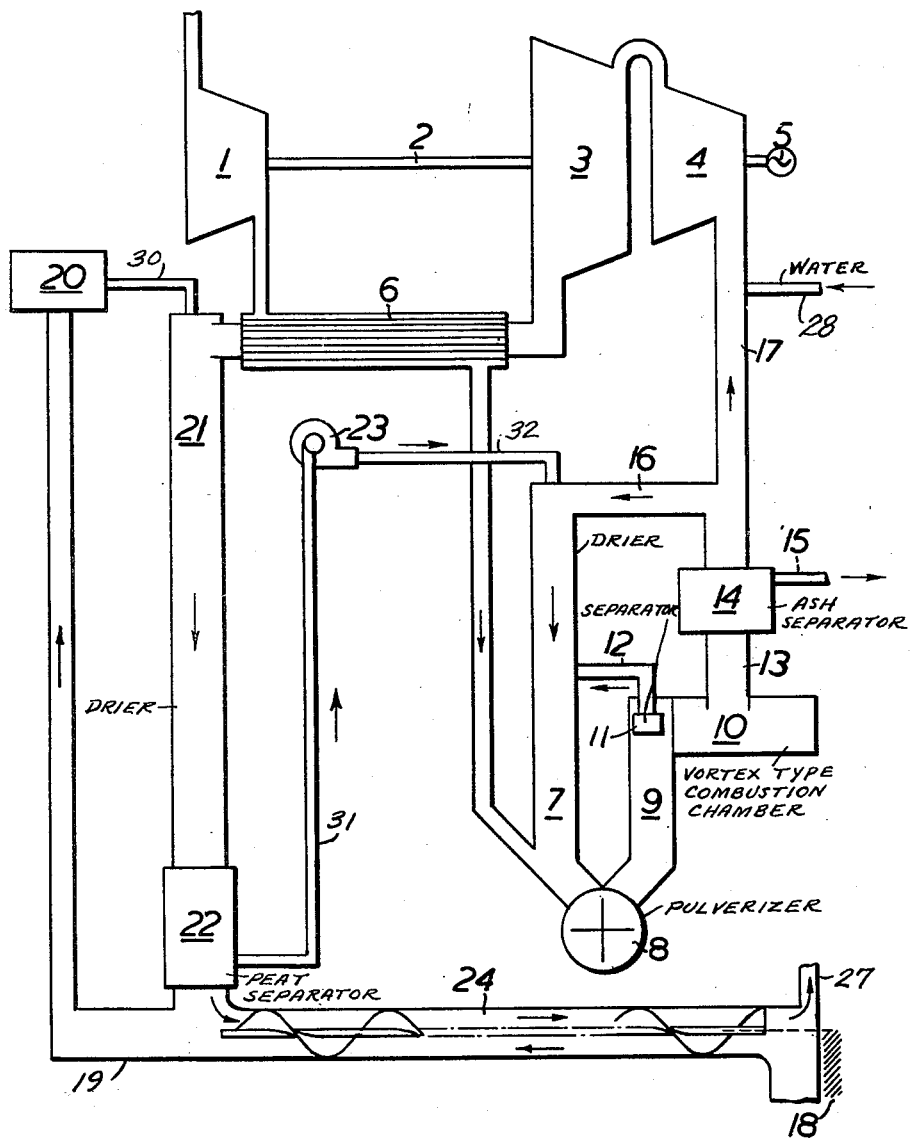
Figure 1 is a diagrammatic layout of a gas turbine power plant.

In Figure 1 there is shown a gas turbine driven alternator plant utilizing peat, comprising a centrifugal compressor 1 mounted on the same shaft 2 as an axial flow turbine 3 which drives it. A power turbine 4 is mounted for series flow with turbine 3 and drives an alternator 5. The air delivery from the compressor 1 is led through a heat exchanger 6 to a fuel drier 7.

Raw peat to be used as fuel is excavated from its site 18 by a suitable grading machine or drag line (not shown) and is conveyed by a spiral conveyor 24 through duct 19 to a press 20 which serves to remove some or all of the mechanically bound water content of the peat. The press may take the form of a centrifuge or drum filter press. The method of winning the peat may be such as to secure the necessary amount of preliminary drying by drainage and natural evaporation.

The peat passes from the press 20 through duct 30 into the predrier 21, in which it is subjected to a pre-drying process by the exhaust gases whereby some of the water content of the peat is evaporated (as will be explained more fully below). The peat with its remaining water content is then separated from the evaporated water and exhaust gases by separator 22, and led through duct 31 to peat pump 23 and then through duct 32 into the drier 7, wherein some or all of the remaining water content is evaporated as will be explained below.

A pulverizer 8, situated at the outlet of the drier 7, pulverizes the peat and breaks up the woody and fibrous particles. The peat is entrained in the air supplied to the drier 7 by the compressor 1, and passed through passage 9 to combustion chamber 10. The coarser peat particles are separated off by means of a separator 11 and re-circulated by passage 12 to the drier 7.

The combustion chamber 10 is of a type providing as long a path as possible in order to ensure that practically all the peat has time to burn. Thus a suitable form is a cyclone or vortex type combustion chamber wherein the peat moves over a vortex path within a chamber having an axial outlet and performs a fairly large number of complete revolutions about the axis of the chamber while approaching the axial outlet through which the products of combustion pass to the turbine. One such combustion chamber is described in copending application Serial No. 250,701, filed October 10, 1951, in the name of Lloyd.

It is a characteristic property of peat that the ash produced by combustion thereof normally has a high fusion point and low abrasive properties. For this reason, the ash may in some circumstances be passed through the turbine without damage to the blades. However, in some cases, as for example where the peat is contaminated with sand, it will be necessary to separate the coarser constituents of the ash from the combustion gases before they enter the turbine. Accordingly the products of combustion pass through the outlet passage 13 of the combustion chamber into an ash separator 14, the fly ash being taken off through duct 15.

Part of the combustion products passing from the ash separator 14 are recirculated back through duct 16 into the drier 7, while the remainder passes on through duct 17 to drive the turbines 3 and 4.

The recirculated part of the gases mixes with the peat in the drier 7 and serves to evaporate some or all of the water content thereof as mentioned above. The resulting steam is retained in the working fluid system and is expanded through the turbines together with the combustion gases resulting from combustion of the fuel and excess air.

The hot exhaust gases leaving the turbine 3 are led into the heat exchanger 6, in which part of the heat content thereof is transferred to the high pressure air from the compressor, and thence into the predrier 21. The hot gases mix with the incoming peat from the press 20 and evaporate part of the water content thereof. The peat with its remaining water content is separated off by separator 22 as previously mentioned, while the exhaust gases and evaporated water are led into the spiral conveyor 24 to preheat the incoming peat by giving up part of their latent heat, and finally escape to atmosphere through vent 27.

The advantages of reduction in size of the plant mentioned above can be realized to the greatest advantage by reducing the air-fuel ratio to the stoichometric value, i. e. the minimum value consistent with complete combustion of the fuel, and then introducing sufficient water into the turbine to maintain the desired maximum turbine inlet temperature. The introduction of water under these conditions is herein termed "maximum water injection." It can be shown that for gas turbine plant using maximum water injection, the overall size and therefore the specific cost and weight of the plant can be reduced to approximately one third for a given output or conversely, for a given size, the output can be increased approximately three fold, compared with the corresponding normal dry cycle.

To achieve the above-mentioned advantages, the incoming peat is dried in predrier 21 to such an extent that its remaining water content when it is passed to the drier 7 is substantially that conforming to a condition of maximum water injection.

The inlet temperature and output of the turbine may be regulated by injecting a small quantity of water into the duct 17 through inlet 28.

Figure 2:
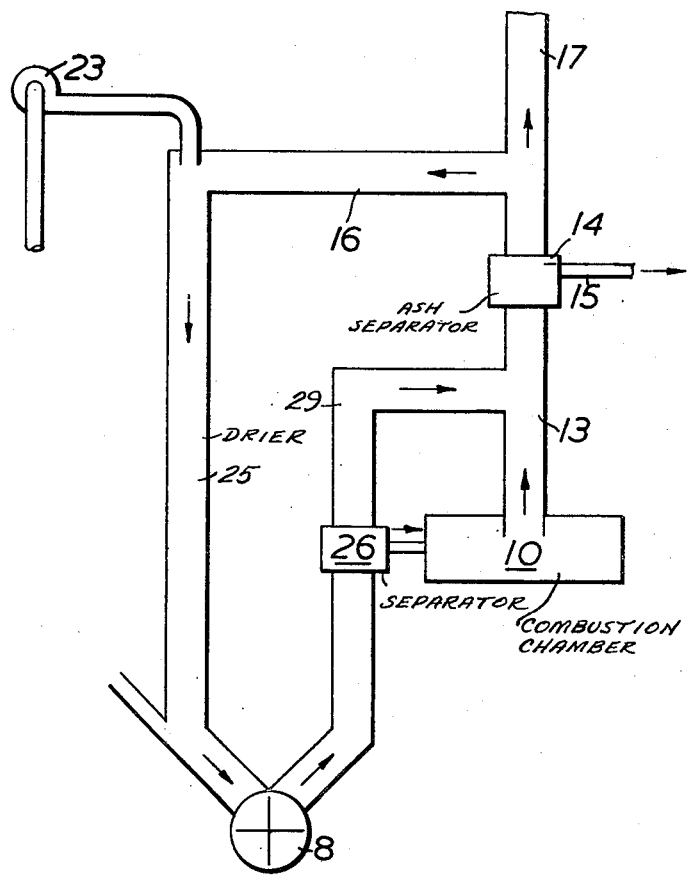
Figure 2 is a modification of the plant shown in Figure 1.

In the modified plant of Figure 2, the peat, steam and recirculated combustion gases pass from the drier 25 and pulverizer 8 to a separator 26 from which the peat and some of the gaseous products pass into the combustion chamber 10 while the most of these gaseous products bypass the combustion chamber by conduit 29 and are mixed with the combustion products in conduit 13.

I claim:

1. An open cycle gas turbine power plant for utilizing solid water-bearing fuel, comprising a fuel drier for evaporating at least part of the water content of the fuel having an inlet for said fuel and an outlet; a separator for separating at least part of said evaporated water content from the solid content of the fuel having an inlet connected to the outlet of the drier, a first outlet for said part of the evaporated water content and a second outlet for said solid content; a combustion chamber having an inlet and an outlet, said inlet being connected to the second outlet of the separator; means for supplying air to the combustion chamber; a turbine having an inlet connected to said outlet of the combustion chamber; and a connection by-passing the combustion chamber, between the first outlet of the separator and the turbine inlet.

2. An open cycle gas turbine power plant utilizing solid water-bearing fuel, comprising a fuel drier for evaporating at least part of the water content of the fuel, having a first inlet for said fuel, a second inlet and an outlet; a combustion chamber having an inlet and an outlet, said inlet being connected to the outlet of the drier; means for supplying air to the combustion chamber; a turbine having an inlet connected to the outlet of the combustion chamber; and a connection between the outlet of the combustion chamber and said second inlet of the drier to lead part of the combustion gases into the drier to evaporate said part of the water content.

3. An open cycle gas turbine power plant utilizing solid water-bearing fuel, comprising a fuel drier for evaporating at least part of the water content of the fuel, having a first inlet for said fuel, a second inlet and an outlet; a separator for separating at least part of said evaporated water content from the solid content of the fuel, having an inlet connected to the outlet of the drier, a first outlet for said part of the evaporated water content and a second outlet for said solid content; a combustion chamber having an inlet and an outlet, said inlet being connected to said second outlet of the separator; means for supplying air to the combustion chamber; a turbine having an inlet connected to said outlet of the combustion chamber; a connection by-passing the combustion chamber, between the first outlet of the separator and the turbine inlet; and a connection between the outlet of the combustion chamber and said second inlet of the drier to lead part of the combustion gases into the drier to evaporate said part of the water content.

4. An open cycle gas turbine power plant for utilizing solid water-bearing fuel, comprising a first fuel drier for evaporating part of the water content of the fuel, having an inlet for said fuel, a first outlet to atmosphere for said evaporated part of the water content and a second outlet for the solid content and remaining water content of the fuel; a second fuel drier for evaporating at least part of the remaining water content having an inlet and an outlet, said inlet being connected to said second outlet of the first drier; a combustion chamber having an inlet and an outlet, said inlet being connected to the outlet of the second fuel drier; means for supplying air to the combustion chamber; and a turbine having an inlet connected to the outlet of the combustion chamber.

5. An open cycle gas turbine power plant utilizing solid water-bearing fuel, comprising a first fuel drier for evaporating part of the water content of the fuel, having an inlet for said fuel, a first outlet to atmosphere for said evaporated part of the water content and a second outlet for the solid content and remaining water content; a second fuel drier having a first inlet connected to the second outlet of the first drier, a second inlet, and an outlet; a combustion chamber having an inlet connected to the outlet of the second drier, and an outlet; means for supplying air to the combustion chamber; a connection between the combustion chamber outlet and the second inlet of the second drier affording a path for leading hot combustion gases into contact with the fuel in the second drier to evaporate at least part of the remaining water content of the fuel; and a turbine having an inlet connected to the combustion chamber outlet.

6. An open cycle gas turbine power plant utilizing solid water-bearing fuel, comprising a first fuel drier for evaporating part of the water content of the fuel having a first inlet for said fuel, a second inlet, and an outlet; a separator having an inlet connected to the outlet of the first drier, a gas outlet to atmosphere, and a second outlet for the solid content of the fuel and the remaining water content; a second fuel drier having a first inlet connected to the second outlet of the separator, a second inlet and an outlet; a combustion chamber having an inlet connected to the outlet of the second drier and an outlet; means for supplying air to the combustion chamber; a connection between the combustion chamber outlet and the second inlet of the second drier affording a path for leading hot combustion gases into contact with the fuel in the second drier to evaporate at least part of the remaining water content of the fuel; a turbine having an inlet connected to the combustion chamber outlet and an outlet connected to the second inlet of the first drier whereby hot exhaust gases are led into contact with the fuel in said drier to evaporate said part of the water content thereof.

7. A method of operating an open cycle gas turbine power plant including a combustion chamber and a turbine, comprising the steps of supplying to the plant a solid water-bearing fuel, evaporating part of the water-content of the fuel and rejecting said part from the working fluid cycle, evaporating at least part of the remaining water content, supplying the solid content of the fuel and any residual water content to the combustion chamber, supplying air to the combustion chamber in a quantity substantially corresponding to a stoichiometric air-fuel ratio, burning said solid content in said air, and supplying both the resulting combustion gases and said evaporated part of the remaining water content to drive the turbine, the quantity of water evaporated and rejected in said first stage of evaporation being such that the quantity of water remaining is substantially that required for a condition of maximum water injection.

References Cited in the file of this patent

UNITED STATES PATENTS

| Number | Name | Date |
| --- | --- | --- |
| 871,993 | Goldsborough | Nov. 26, 1907 |
| 1,197,456 | Dinsmore | Sept. 5, 1916 |
| 1,578,181 | Balmer | Mar. 23, 1926 |
| 1,809,819 | Caller | June 16, 1931 |
| 2,032,402 | Colby | Mar. 3, 1936 |
| 2,066,418 | O'Mara | Jan. 5, 1937 |
| 2,171,535 | Berg | Sept. 5, 1939 |
| 2,401,285 | Woodward | May 28, 1946 |
| 2,542,953 | Williams | Feb. 20, 1951 |

FOREIGN PATENTS

| Number | Country | Date |
| --- | --- | --- |
| 18,329 | Great Britain | Aug. 24, 1904 |
| 2,511 | Great Britain | Jan. 30, 1914 |
| 166,517 | Great Britain | Sept. 7, 1922 |
| 595,947 | Great Britain | Dec. 23, 1947 |
| 391,315 | France | Aug. 26, 1908 |